3,558,583
EXTRUSION RESIN
Richard G. Alsup, Vienna, W. Va., and John A. Ross, Media, Pa., assignors to E. I. du Pont de Nemours and Company, Wilmington, Del., a corporation of Delaware
No Drawing. Continuation of application Ser. No. 407,857, Oct. 30, 1964. This application Sept. 13, 1967, Ser. No. 667,359
Int. Cl. C08f 1/88, 3/24
U.S. Cl. 260—92.1                 13 Claims

ABSTRACT OF THE DISCLOSURE

The molding rate and the strength of moldings of fluorocarbon resins, e.g. polytetrafluoroethylene, are improved by partially sintering the resins (10–50%) by heating the resins at a temperature in the range 332–338° C.

---

This application is a continuation of our copending application Ser. No. 407,857, filed Oct. 30, 1964, now abandoned.

This invention relates to a novel polymer, and, more particularly, to a fluorocarbon resin which is partially sintered and which may be extruded at higher rates to a product having improved physical properties as compared with material of the prior art.

Fluorocarbon resins have been subjected to elevated temperatures to improve various properties of the resin. As employed in the prior art in the fabrication of fluorocarbon resins, sintering has been accomplished by heating the resin above the crystalline melting point until the resin completely coalesces or agglomerates, i.e. until the resin is fused into a substantially unitary mass by the adhesion of adjacent resin particles. In U.S. Pat. 2,456,621, issued on Dec. 21, 1948, to A. J. Cheney, Jr., there is disclosed a process which consists of prebaking finely-divided tetrafluoroethylene prior to extrusion. This prebaking either completely sinters the resin, cf. Examples 2, 6, 7 and 8, or does not sinter to any material extent, cf. Examples 3 and 5. In U.S. Pat. 2,485,691, issued on Oct. 25, 1949, to S. B. Bogese, there is dislclosed a blend of 25 to 95% by weight of finely divided, sintered polytetrafluoroetheylene with the unsintered polymer. The patentee alleges that this blend exhibits improved extrusion performance and provide coatings on objects which are uniform, flexible and tough. Heat-treatment has also been employed to improve the color of fluorocarbon resins, e.g., in U.S. Pat. 2,392,389, issued on Jan. 8, 1946, to R. M. Joyce, Jr., there is disclosed a process wherein heat-darkenable polytetrafluoroethylene is heated in the range of 50 to 500° C., in an oxidizing atmosphere. Initially, the heating causes the polymer to darken but eventually it becomes colorless upon sintering and turns white when cooled.

The present invention provides a novel fluorocarbon resin which can be extruded to products having excellent physical properties at rates greatly in excess of those possible by prior art materials. The extrusion resin of this invention comprises a plurality of granules of fluorocarbon resin and especially granules of polyetetrafluoroethylene, which granules have been maintained at temperatures in the range of 332 to 338° C. (temperature of the polymer) for approximately 10 to 60 minutes depending upon the resin, the heating technique and the degree of modification desired. Heating periods of longer than 60 minutes may be employed at low temperatures provided that the heat is maintained until the granules are between 10 and 50% sintered at which time the heat is removed and the resin is cooled and placed in condition for extrusion by known techniques. The optimum size of the granules thus produced in from 20 to 700 microns. The exposure of the resin to the temperatures indicated is critical to the present invention. The resin exhibits unsatisfactory extrusion properties at high rates if underexposed and resembles the prior art if overexposed and resin will extrude satisfactorily but the extrudate is deficient in strength.

The extrudability or extrusion performance of fluorocarbon resins may be readily evaluated in commonly-used types of ram extruders. Untreated resin will exhibit charge to charge deflects, even at moderate rates of extrusion, e.g. ten feet/for for one half inch diameter rod. The defects are caused by poor coalescence between successive charges to the ram extruder resulting in an extrudate which is weak at the interface of two charges. The partially-sintered resin of the present invention eliminates this interfacial weakness and permits the resin to be processed at rates at least double those of untreated material. In addition to the improved extrusion performance of partially-sintered resin, the extrudate is markedly stronger than that obtained from an unsintered resin, a completely-sintered resin or a blend of unsintered and completely-sintered resins. The partially-sintered resin of this invention is from 75 to 90% crystalline corresponding to 10 to 50% sintered, and, in optimum form, from 76 to 86% crystalline corresponding to 20 to 40% sintered. Unsintered resin is 94 to 96% crystalline, and completely-sintered resin is about 50% crystalline as determined by known infrared or X-ray techniques. The extent or degree of sintering of the present resin is conveniently determined by the commonly applied technique of differential thermal analysis, i.e. by comparing the characteristics of the polymer upon heating with an inert reference under similar conditions. In the present case, a 50 milligram sample is heated at a rate of 5.6° C. per minute in an atmosphere of air to obtain a thermogram having characteristic endotherm peaks at 327 and 345° C. The relative heights of the peaks are noted and the percent sintering is calculated from the following equation where X is the peak height at 327° C. and Y is the peak height at 345° C.

$$\text{Percent sintered} = \frac{2X}{2X+Y} \times 100$$

The following examples are presented to illustrate and not to restrict the present invention. Parts and percentages are by weight unless otherwise noted. Tensile strength and percent elongation are measured by ASTM D–1710.

EXAMPLES 1 THROUGH 6

A commercial granular, polytetrafluoroethylene resin, having a standard specific gravity of 2.15 as measured by ASTM 1457–62T was employed as the starting material. This resin was heated in a "Hot Pack" air-circulating oven containing two rows of ten trays each. The trays having a dimension of 17" x 20" were charged with approximately six pounds of resin per tray. The depth of the resin in the trays was about ½". The oven air temperature was set at 350 to 355° C. (except for Example 5 wherein the temperature was set at 335° C.) and the trays were placed in the oven. The temperature of the resin is kept between 332° and 338° C. When the degree of sintering indicated in Table I had been reached, the hot trays were transferred to a cooling chamber for approximately 30 minutes following which the partially-sintered resin was removed from the tray as a friable slab. This slab was then passed through a standard impact mill having a screen with ⅛" openings. The resin was obtained from the mill in a free-flowing, granular form. This resin was then charged to a standard ½" ram extruder. The barrel was maintained at a temperature of from 380 to 400° C., and the resin was permitted to fall into the heated zone and forced by a reciprocating ram through the extruder. After the rod passed through the heating zone, it was cooled and solidified before reaching the exit of the extruder as a solid ½" rod. No restriction was in the extruder to cause back pressure. However, if necessary, a brake could be used on the merging rod to increase back pressure within the unit. The rods thus produced were examined for tensile strength and elongation according to the tests mentioned hereinabove and the results reported in Table I for two different speeds of extrusion. It should be noted that the untreated materials exhibited interfacial weakness at the lower speed as well as complete interfacial-fracture at higher speed. In addition, the untreated material exhibited low tensile strength and elongation. It should be noted that when the resin is partially sintered, the extrusion characteristics and the tensile strength of the material are markedly improved. The sample in Table I listed as prior art indicates that although material that is completely sintered may be extruded satisfactorily, the extrudate is inferior in physical properties to that produced by the partially-sintered material of the present invention.

TABLE I

| | | Extrusion rate, feet/hour | | | |
|---|---|---|---|---|---|
| | | 10–12 Extrudate properties | | 18 Extrudate properties | |
| Example No. | Sintered, percent | Tensile strength, p.s.i. | Elongation, percent | Tensile strength, p.s.i. | Elongation, percent |
| Control | 0 | ¹1,320 | ¹20 | (²) | (²) |
| 1 | 20 | 2,640 | 255 | 2,580 | 255 |
| 2 | 29 | | | 2,580 | 235 |
| 3 | 29 | | | 2,810 | 260 |
| 4 | 30 | 2,220 | 250 | 2,090 | 215 |
| 5 | 30 | 2,750 | 280 | 2,610 | 247 |
| 6 | 40 | | | 2,050 | 170 |
| Prior art | 100 | 1,750 | 110 | | |

¹ Slight fracture.
² Complete fracture.

The advantages of the instant resin are not realized by blending completely-sintered and unsintered polytetrafluoroethylene. A blend containing 33% completely-sintered resin and 67% unsintered resin will exhibit interfacial-fracture when ram extruded at 10 to 12 feet/hour. Approximately 50% of completely-sintered material must be present in the blend before it will extrude satisfactorily at rates above 10 feet/hour but the extrudate exhibits inferior physical properties compared to the partially-sintered resin of the present invention.

This invention finds widespread use in the ram extrusion of strong shaped articles from fluorocarbon resins which exhibit enhanced physical properties, and which may be produced at rates substantially in excess of those possible with prior art materials.

We claim:
1. A fluorocarbon molding resin comprised of discrete granules, substantially all of said granules being from 10 to 50% sintered.

2. A ram-extrudable fluorocarbon resin comprising a plurality of granules having an average diameter of 20 to 700 microns as a substantial portion of said resin and being from 10 to 50% sintered.

3. The resin of claim 1 wherein said granules are from 20 to 40% sintered.

4. The resin of claim 2 wherein said granules are from 20 to 40% sintered.

5. A ram-extrudable polytetrafluoroethylene resin composed of a plurality of granules, substantially all of said granules being partially sintered and having a crystallinity of 75 to 90%.

6. The product of claim 5 wherein said granules exhibit a crystallinity of 76 to 86%.

7. A ram-extrudable polytetrafluoroethylene resin composed of a plurality of granules, substantially all of said granules being partially sintered and having a crystallinity of 75 to 90%, said resin having two distinct melting peaks as measured by differential thermal analysis of about 327 and about 345° C.

8. A ram-extrudable polytetrafluoroethylene resin composed of a plurality of granules having an average particle size of 20 to 700 microns, and having a gradient of sintering from the inner portion to the outer portion of said granules such that the entire granule is from about 10 to 50% sintered.

9. A process for producing a ram-extrudable fluorocarbon resin which comprises heating a polytetrafluoroethylene starting material having a crystallinity of about 94 to 96% and a standard specific gravity of 2.14 to 2.22 at a temperature of 332 to 338° C. for a period sufficient to reduce the crystallinity of said starting material to about 75 to 90%.

10. The process of claim 9 wherein said crystallinity is reduced to 76 to 86%.

11. A process for improving the extrudability of a fluorocarbon resin having a crystallinity in the range of 94 to 96% which comprises heating said resin at a temperature of 332 to 338° C. for a time sufficient to reduce said crystillinity to about 75 to 90%.

12. The process of claim 11 wherein said crystallinity is reduced to about 76 to 86%.

13. A process for improving the extrudability of a fluorocarbon resin starting material having a crystallinity of 94 to 96% which comprises heating said starting material at a temperature of 332 to 338° C. for a period from 10 to 60 minutes and thereafter cooling and deagglomerating the partially-sintered resin.

References Cited

UNITED STATES PATENTS 2,456,671   12/1948   Cheney _____ 260—92.1

JOSEPH L. SCHOFER, Primary Examiner

J. A. DONOHUE, JR., Assistant Examiner